United States Patent
Hurwic et al.

(10) Patent No.: US 7,409,889 B2
(45) Date of Patent: Aug. 12, 2008

(54) BOOSTER CONTROL ROD COUPLING ARRANGEMENT

(75) Inventors: Aleksander Hurwic, Paris (FR); Ulysse Verbo, Aulnay Sous Bois (FR); Philippe Richard, Chelles (FR); Silverio Batista, Noisy le Sec (FR)

(73) Assignee: Robert Bosch GmbH, Stuttgart (DE)

( * ) Notice: Subject to any disclaimer, the term of this patent is extended or adjusted under 35 U.S.C. 154(b) by 1160 days.

(21) Appl. No.: 10/651,337

(22) Filed: Aug. 27, 2003

(65) Prior Publication Data

US 2007/0193392 A1   Aug. 23, 2007

(51) Int. Cl.
   *G05G 1/30* (2008.04)
(52) U.S. Cl. ........................................................ 74/560
(58) Field of Classification Search ................ 74/502.4, 74/502.6, 512, 529, 560; 403/DIG. 8, 6, 403/263, 326, 360, 361
   See application file for complete search history.

(56) References Cited

U.S. PATENT DOCUMENTS

| | | | | |
|---|---|---|---|---|
| 3,041,093 A | * | 6/1962 | Bonfiglio | 403/9 |
| 3,766,802 A | * | 10/1973 | Shellhause | 74/512 |
| 3,853,416 A | * | 12/1974 | Hanan | 403/322.1 |
| 3,856,336 A | * | 12/1974 | Karcher et al. | 285/316 |
| 4,655,628 A | * | 4/1987 | Parker | 403/163 |
| 4,694,706 A | * | 9/1987 | Lichtenberg et al. | 74/501.5 R |
| 5,000,614 A | * | 3/1991 | Walker et al. | 403/326 |
| 5,221,154 A | * | 6/1993 | Foulquier et al. | 403/12 |
| 5,261,292 A | * | 11/1993 | Gabas et al. | 74/501.5 R |
| 5,518,332 A | * | 5/1996 | Katoh | 403/155 |
| 5,567,047 A | * | 10/1996 | Fritsch | 366/129 |
| 5,934,151 A | * | 8/1999 | Carr et al. | 74/512 |
| 6,263,756 B1 | * | 7/2001 | Gabas Cebollero et al. | 74/502.4 |
| 6,340,265 B1 | * | 1/2002 | Suzuki et al. | 403/316 |

* cited by examiner

*Primary Examiner*—Chong H Kim
(74) *Attorney, Agent, or Firm*—Leo H. McCormick, Jr.; Sarah Taylor (57) ABSTRACT

An arrangement (10) for disconnectably coupling an axially orientated motor vehicle brake booster control rod (12) to a brake pedal (14). A first end (16) of the control rod (12) is coupled to an intermediate part (20) of a vertical actuating bar (22) of the brake pedal (14). The first end (16) has a head (32) with at least one spherical bearing surface (34) that is housed in a complementary boss (36) formed in a wall of the intermediate part (20). The head (32) is kept in contact with the boss (36) via elastically deformable axial retention means (38) interposed between the intermediate part (20) of the actuating bar and the control rod (12). The deformation is controlled by an unlocking arrangement (52) that accessible from outside of the intermediate part (20) of the actuating bar (22).

21 Claims, 7 Drawing Sheets

Prior Art

BOOSTER CONTROL ROD COUPLING ARRANGEMENT

The invention relates to an arrangement for coupling a booster control rod to an actuating bar bearing a brake pedal.

The invention relates more specifically to an arrangement for disconnectably coupling an axially orientated motor vehicle brake booster control rod to a brake pedal of the vehicle, of the type in which one end of the axial control rod is coupled at least in terms of rotation about a transverse axis to an intermediate part of a roughly vertical actuating bar, one end of which is articulated about a roughly horizontal axis with respect to a vehicle body structural element, and the other end of which bears the brake pedal.

Numerous examples of arrangements of this type are known.

According to a first known design, arrangements have been proposed in which the end of the control rod and the intermediate part of the bar have passing them a common axle which is transversely immobilized by a pin.

Performing coupling in such an arrangement therefore entails both axial positioning and transverse positioning of the end of the control rod with respect to the intermediate part of the actuating bar. What is more, such coupling requires an operation of locking the pin.

Another disadvantage with this design is that the intermediate part of the actuating bar is unable to move with respect to the booster control rod.

As a result, if the vehicle experiences a violent impact causing deformation in the transverse direction of the bulkhead to which the booster is fixed, the latter may carry the actuating bar with it and move the actuating bar of the brake pedal transversely, with the risk then of injuring of the driver's ankles.

To remedy these disadvantages, there has been proposed, particularly in document EP-A1-0 896 162 and EP-B1-0 229 350 an arrangement of the type described hereinabove comprising a nesting connection of the ball joint type, able easily to be mounted or disconnected, and arranged between the end of the booster control rod and the intermediate part of the actuating bar. In those documents, the end of the control rod is shaped as a spherical head and is housed in an attached element comprising a spherical cap of complementary shape, which comprises means for nesting the head in the cap, and is itself nested in the intermediate part of the control bar.

The disadvantage with such a design is that the spherical cap, which bears against the spherical head of the booster control rod during each braking action, is not directly connected to the actuating bar bearing the brake pedal. As a result, the repeated forces exerted by the driver on the cap are transmitted not only to the control rod but also to the nesting means inserted between the attached element which comprises the cap and the to actuating bar. There is therefore a risk with this design that in the course of the repeated actuations of the actuating bar, these nesting means will become worn and ultimately break, causing the cap and the actuating bar to become disconnected.

To remedy this disadvantage, there has been proposed a novel is design in which the head of the control rod is acted upon directly by the actuation bar.

To this end, an arrangement has been proposed in which the end of the control rod, shaped in the form of a spherical head, is housed in a complementary boss formed in a wall of the intermediate part of the actuating bar. In this configuration, the head is kept in contact with said boss via elastic axial retention means borne by the cap, such as elastic tabs bearing against the back of the spherical head to urge it into contact with the boss.

The disadvantage with this design is that it requires either the use of a tool of complex shape to part these elastic tabs or the breakage of these elastic tabs in order to be able to uncouple the control rod from the intermediate part of the actuating bar.

The invention proposes a novel design in which the control rod can be coupled or uncoupled to or from the intermediate part of the actuating bar at will.

To this end, the invention proposes an arrangement of the above described type, characterized in that the head is kept in contact with said boss via elastically deformable axial retention means interposed between the intermediate part of the actuating bar and the control rod, and the deformation of which is controlled by unlocking means accessible from outside the intermediate part of the actuating bar, so as to form a connection of the ball joint type that can be disconnected at will.

According to other features of the invention:
the intermediate part of the actuating bar is shaped as a U-section orientated roughly vertically and comprising:
  two flanges between which the control rod is housed and between which the elastically deformable axial retention means and the unlocking means are arranged, and
  a connecting wall arranged transversely between the two flanges in which wall the boss housing the spherical bearing surface of the head of the control rod is formed;
the intermediate part of the actuating bar houses, between its flanges:
  first holding means intended to immobilize, in line with the base of the head of the rod, an elastic clip which forms the elastically deformable axial retention means intended to axially immobilize the head of the rod against the boss and which can be deformed elastically by the unlocking means to release the head,
  second holding means for holding the unlocking means;
the arrangement comprises a mounting plate comprising the first and second holding means, which plate is housed between the flanges of the intermediate part of the actuating bar, a first bore of which has the rod passing through it with clearance to allow said rod to be articulated, and which comprises:
  a vertical housing opening into the upper part of the mounting plate, which intersects the first bore roughly in line with the base of the head of the rod and which forms the first holding means for holding the vertical elastic clip that forms the axial retention means,
  a cavity opening into the vertical housing facing the clip and into a face of the mounting plate facing an opening of the intermediate part of the actuating bar, and which forms the second holding means holding the unlocking means intended to elastically deform the clip.
the mounting plate is fixed between the flanges of the intermediate part of the actuating bar by at least two elastic pins passing through drillings in the mounting plate and drillings in the flanges of the intermediate part of the actuating bar.
the clip is a hairpin clip intended to straddle the control rod and the roughly parallel vertical branches of which can move between:
  a close-together position, towards which they are elastically returned, in which they are parallel and bear axially against a retention bearing surface of the head of the rod which is opposite its spherical bearing surface so as to immobilize the head against the boss, and a parted position in which they can be temporarily elastically urged apart by unlocking means in the transverse direction, so as to release the head and allow the rod to be withdrawn from the mounting plate, the bore in the mounting plate which accommodates the control rod is of a diameter roughly corresponding to the maximum diameter of the retention bearing surface of the control rod, the hairpin clip comprises an elastic upper transverse connecting branch connecting the parallel vertical branches and resting on a wall of the mounting plate, which runs parallel to the axial direction between the axial edges of the housing forming the first holding means and which runs transversely between the vertical branches of the clip to determine the vertical position of the clip, the unlocking means comprise a cylindrical barrel mounted so that it can rotate in an axial second bore constituting the cavity in the mounting plate forming the second holding means, which is arranged between the free ends of the vertical branches of the clip, of which a first end comprising drive means opens into a front face of the mounting plate opposite a drilling made in the connecting wall of the intermediate part of the actuating bar, and of which an intermediate portion comprises two diametrically opposed flats of which the end faces, accommodating the vertical branches of the clip are distant from one another by a distance corresponding to the separation of the vertical parallel branches of the clip in their close-together position, so that rotation of the barrel determines a parted position of the vertical branches in which they are distant by the diameter of the periphery of the barrel, an opposite second end of the barrel comprises a finger housed in a groove in the shape of an arc of a circle formed in the end of the second bore, a first edge of which is intended to form, for the finger, a stop that corresponds to the angular position of the barrel associated with the close-together position of the vertical parallel branches of the clip, and a second edge of which is intended to form, for the finger, a stop which corresponds to the angular position of the barrel associated with the parted position of the vertical branches of the clip, the drive means at the first end of the barrel comprise a socket, particularly a hexagon socket, the bearing surface for retention the head of the control rod is shaped in the form of a portion of a sphere:

the rear minimum diameter of which corresponds to the diameter of the control rod, and a maximum diameter of which is greater than the separation of the vertical parallel branches of the clip in their close-together position and smaller than the separation of the vertical parallel branches of the clip in their parted position.

the head of the control rod has a roughly frustaconical connecting portion inserted axially between its spherical bearing surface and its retention bearing surface to allow the end of the control rod to be introduced through the clip without actuating the barrel, the arrangement comprises a cylindrical peg forming the first holding means for holding the clip, which extends between the flanges from the connecting wall of the intermediate part of the actuating bar and into a groove of which a rounded elastic upper transverse connecting branch of a hairpin clip is intended to fit, the roughly parallel vertical branches of which clip are intended to straddle the rod and axially immobilize its head against the boss;

the rounded elastic upper transverse connecting branch of the clip extends over more than 180 degrees in the groove of the cylindrical peg to determine the vertical position of the clip, the roughly parallel vertical branches of the clip can move between:

a locked position in which they are elastically returned toward one another, a first branch being immobilized by the unlocking means and the second branch being immobilized against a boss of the adjacent flange, in which position they are parallel and bear axially against a retention bearing surface of the head of the rod which is at the opposite end to its spherical bearing surface, so as to immobilize the head against the boss, and an unlocked position in which the first vertical branch is unlocked by the unlocking means then can be elastically urged temporarily by the rod transversely away from the other branch to release the head and allow the rod to be withdrawn from the intermediate part of the actuating bar, the second branch remaining immobilized, the flange of the intermediate part of the actuating bar adjacent to the first branch of the clip has a vertical slot intended to allow the first branch to pass out of the intermediate part of the actuating bar when the said first branch is moved away by the rod, the unlocking means comprise a latch bolt mounted to rotate about an axle of which a first end comprising drive means opens into the connecting wall of the intermediate part of the actuating bar via a drilling forming part of the second holding means, and which can move between a blocking position in which it opposes the transverse parting movement of the first branch of the hairpin clip and a retracted position in which it does not oppose the transverse parting movement of the first branch of the clip and in which the first branch of the hairpin clip can be urged away by the rod, the axle about which the latch bolt rotates is arranged between the vertical branches of the clip and in that the latch bolt runs parallel to the axial direction between two transverse cheeks secured to the axle so that in the blocking position the first branch is transversely immobilized between an intermediate portion of the axle arranged between the cheeks and the latch bolt, and so that in a retracted position the latch bolt is pivoted under the first branch to give it a parting movement, the boss of the flange adjacent to the second branch of the clip projects into the interior of the intermediate part of the actuating bar by a transverse distance intended to allow the transverse immobilization with clearance of the second branch when the clip is in a locked position associated with the blocked position of the latch bolt, the axle about which the latch bolt rotates comprises, on its intermediate portion, a flat arranged opposite the latch bolt to immobilize, without clearance, the second branch against the boss when the latch bolt occupies its retracted position, and thus make it easier to part the first branch of the clip, a second end of the axle of the latch bolt is mounted so that it can rotate in a spacer forming the other part of the second holding means, which is fixed between the flanges of the intermediate part of the actuating bar via at least two elastic pins passing through drillings in the spacer and drillings in the flanges of the intermediate part of the actuating bar, the drive means at the first end of the axle of the latch bolt comprise a socket, particularly a hexagon socket.

the retention bearing surface for retaining the head of the control rod is shaped in the form of a portion of a sphere:
the rear minimum diameter of which corresponds to the diameter of the control rod, and
a maximum diameter of which is greater than the separation of the vertical parallel branches of the clip in their locked position and less than the separation of the vertical parallel branches of the clip when they occupy their unlocked position and the first branch is transversely parted by the booster actuating rod.

Other characteristics and advantages of the invention will become apparent from reading the detailed description which follows, for an understanding of which reference will be made to the attached drawings.

In the description that follows, identical reference numerals denote parts that are identical or have similar functions.

Figure 1:
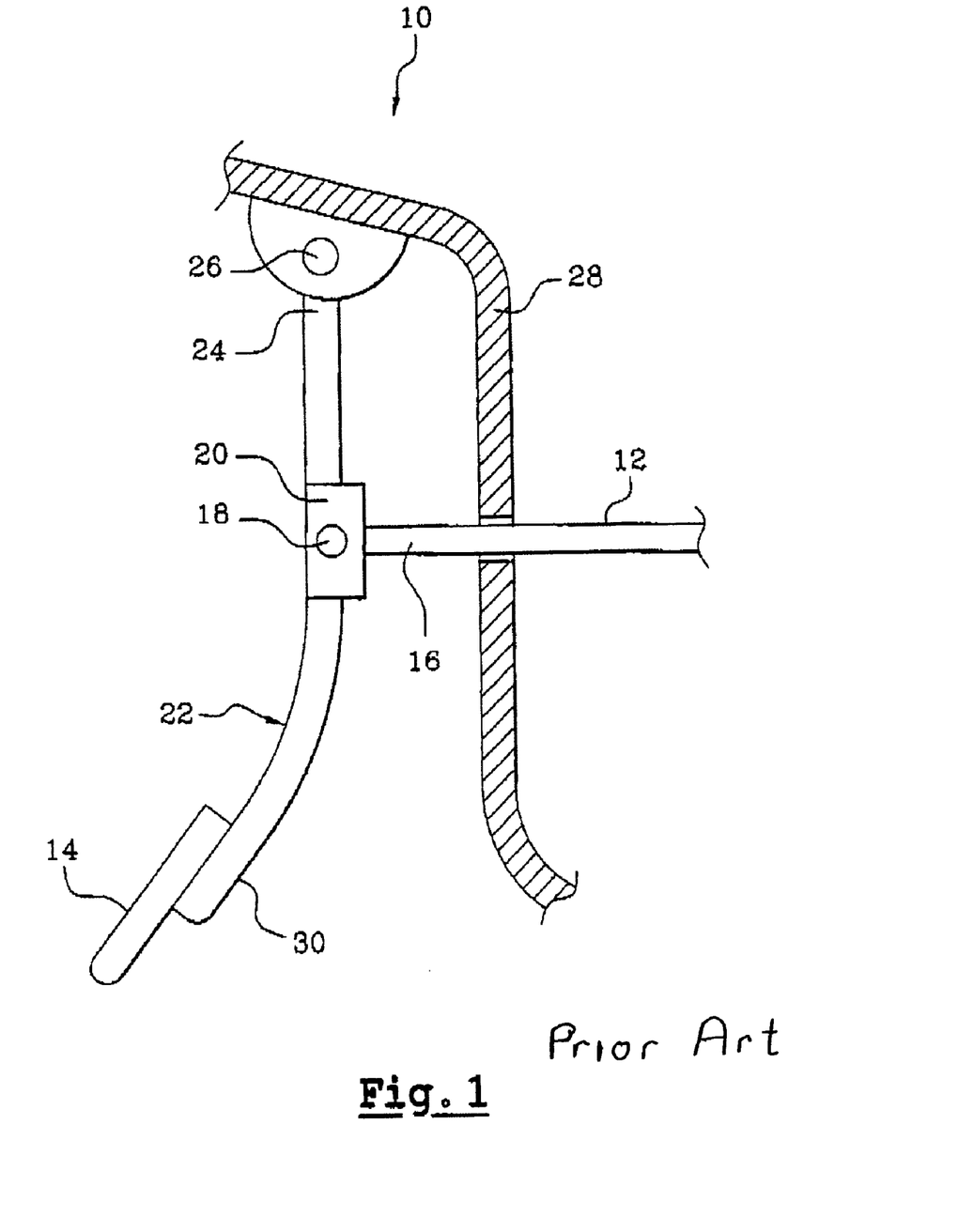
FIG. 1 is an outlined diagram of an arrangement according to the prior art.

FIG. 1 depicts an overall view of a conventional arrangement 10 for the disconnectable coupling of an axially orientated motor vehicle brake booster (not depicted) control rod 12 to a brake pedal 14 of the vehicle. In a known way, in such an arrangement 10, one end 16 of the axial control rod 12 is coupled at least in terms of rotation about a transverse axis, for example via a pivot 18, to an intermediate part 20 of a roughly vertical actuating bar 22, one end 24 of which is articulated about a roughly horizontal axle 26 with respect to a vehicle body structural element 28 and the other end 30 of which bears the brake pedal 14. The pivot 18 for example comprises an axle locked transversely by means of at least one pin (neither depicted).

This design does have the particular disadvantage, during assembly, of requiring an operation of axially positioning and transversely positioning the end 16 of the control rod 12 with respect to the intermediate part 20 of the actuating bar 22 and an operation of locking the pin, making fitting a particularly tricky operation.

To remedy this disadvantage, the invention proposes a novel design comprising an unlockable ball joint mounting inserted between the rod 12 and the intermediate part 20 of the actuating bar 22.

In a known way, as illustrated by FIGS. 2, 3, 4, 6 and 11, the invention proposes an arrangement 10 in which the end 16 of the control rod 12 has a head 32 at least a spherical bearing surface 34 of which is housed 25 in a complementary boss 36 formed in a wall of the intermediate part 20 of the actuating bar 22.

This characteristic is advantageously supplemented by the fact that, according to the invention, the head 32 is held in contact with said boss 36 via elastically deformable axial retention means 38 which are inserted between the intermediate part 20 of the actuating bar and the control rod 12, and the deformation of which is controlled by an unlocking means 52 accessible from outside the intermediate part 20 of the actuating bar 22, to form a connection of the ball joint type that can be disconnected at will.

To this end, as illustrated by FIGS. 2, 3 and 8 to 11, the intermediate part 20 of the actuating bar is shaped as a U-section orientated roughly vertically and comprising:
two flanges 40 between which the control rod 12 is housed and between which the elastically deformable axial retention means 38 and the unlocking means 52 are arranged, and
a connecting wall 42 arranged transversely between the two flanges 40, in which wall the boss 36 housing the spherical bearing surface 34 of the head 32 of the control rod 12 is formed.

In a known way, the boss 36 is formed as an integral part of the intermediate part 20 of the actuating bar 22 and is, for example, formed by pressing the section that forms the intermediate part 20 of the actuating bar 22. In this way, the boss 36 allows the bar 22 to bear directly against the head 32 of the control rod 12, thus avoiding the risks of the coupling thus produced breaking.

Figure 4:
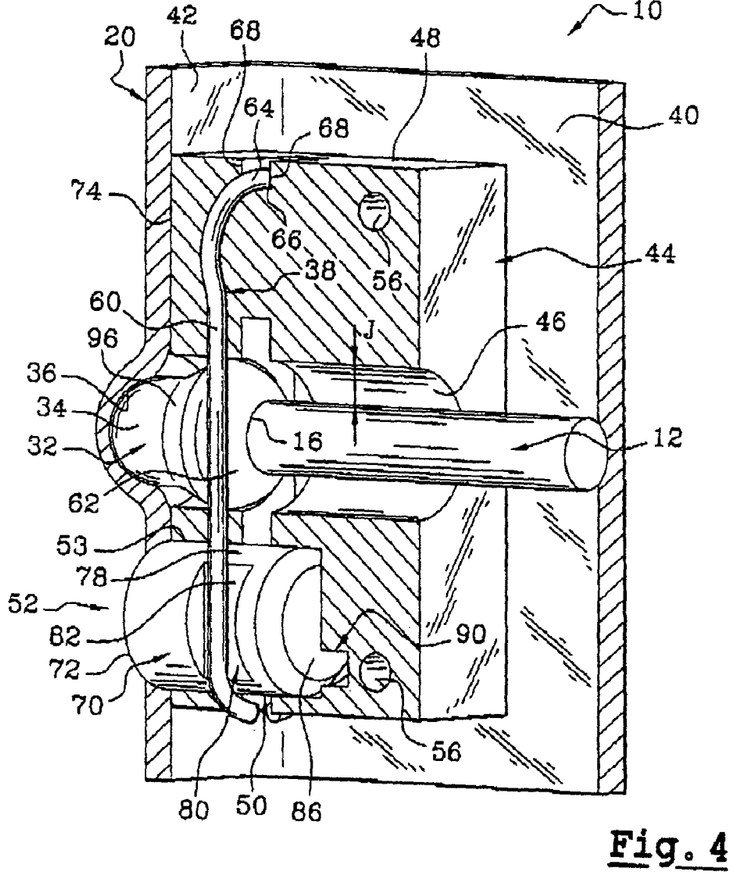
FIG. 4 is an assembled perspective rear view with cut away on an axial plane of the arrangement according to the first embodiment of the invention, depicted in a position in which the vertical branches of the clip are closed together.
Figure 5:
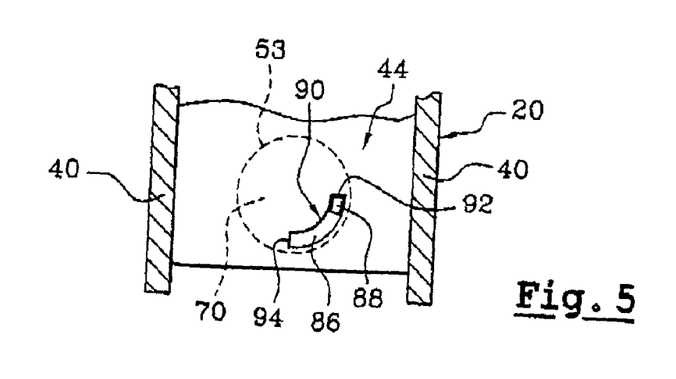
FIG. 5 is a detail view in cross section on 5-5 of FIG. 4 of the position of the finger of the barrel in the groove.
Figure 6:
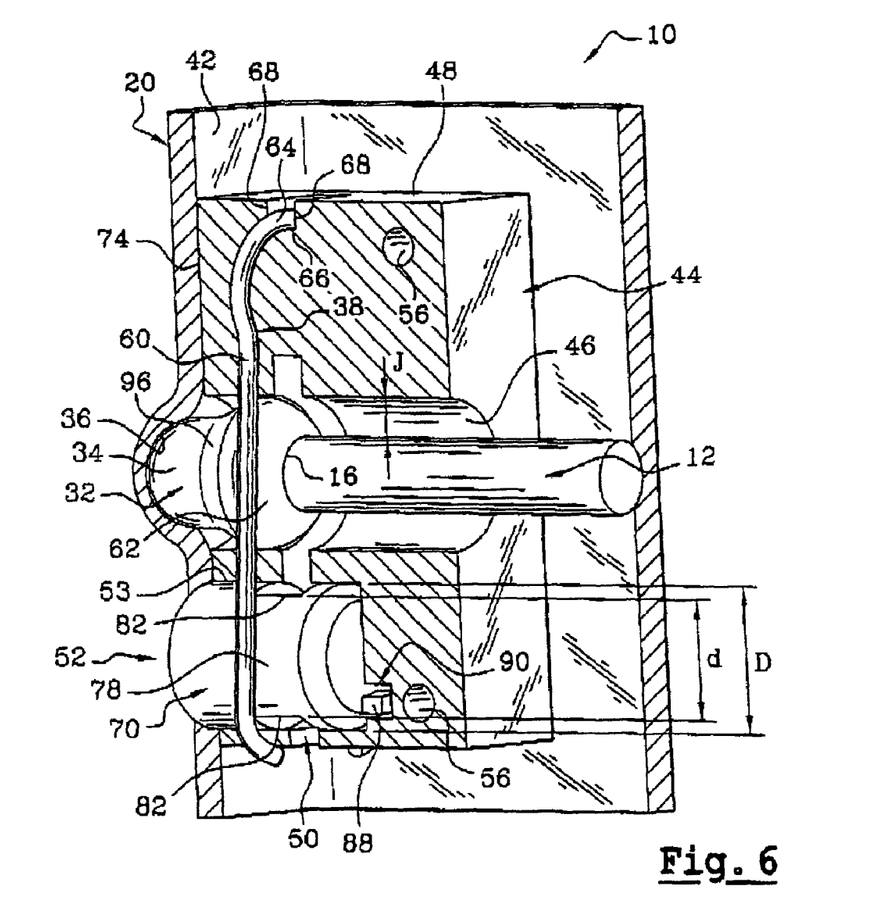
FIG. 6 is an assembled perspective rear view with cut away on an axial plane of the arrangement according to the first embodiment of the invention depicted with the vertical branches of the clip in a parted position.
Figure 7:
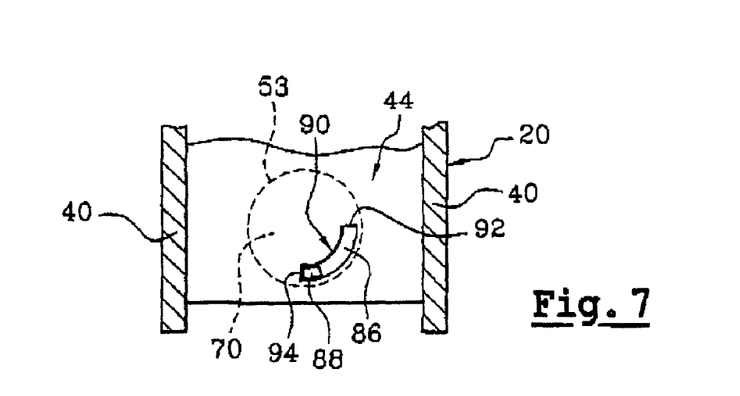
FIG. 7 is a detailed view in cross section on 7-7 of FIG. 6 of the position of the finger of the barrel in the groove.
Figure 11:
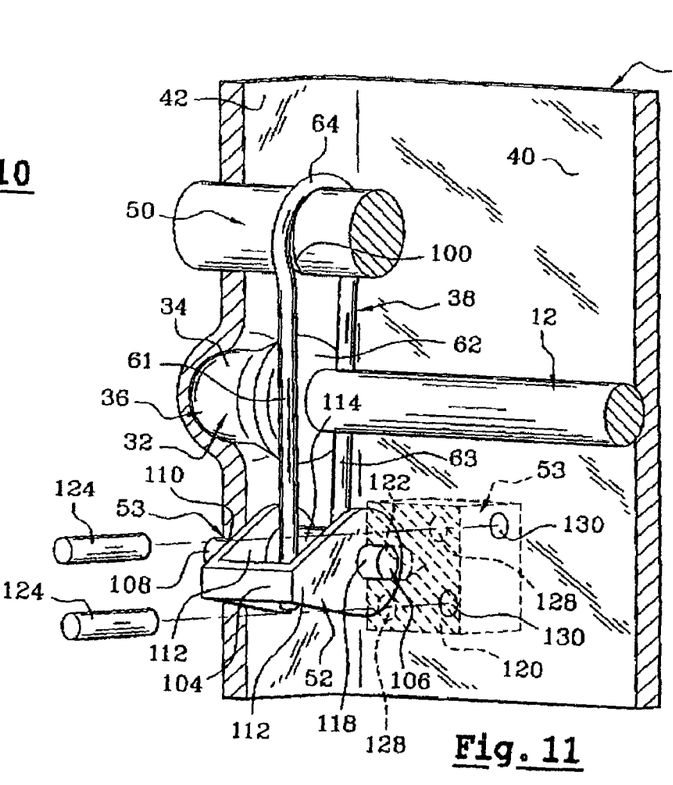
FIG. 11 is an assembled perspective rear view with cut away on an axial plane of the arrangement according to the second embodiment of the invention depicted with the vertical branches of the clip in a locked position.

To this end, as illustrated by FIGS. 4, 6 and 11, the intermediate part 20 of the actuating bar 22 houses, between its flanges 40 first holding means 50 intended to immobilize, in line with the base of the head 32 of the rod 12, an elastic clip 38 which forms the elastically deformable axial retention means intended to axially immobilize the head 32 of the rod 12 against the boss 36 and which can be deformed elastically by the unlocking means to release the head 32, second holding means 53 for holding the unlocking means.

As FIGS. 2 to 7 illustrate, in a first embodiment of the invention, the arrangement 10 comprises a mounting plate 44 housed between the flanges 40 of the intermediate part 20 of the actuating bar and comprising first holding means 50 and second means 53. These means will be explained in greater detail in what follows of the present description.

A first bore 46 of the mounting plate 44 has the rod 12 passing through it with radial clearance "J" to allow it to be articulated about the ball joint formed of this spherical bearing surface 34 and of the boss 36.

Inside this mounting plate 44, as illustrated by FIGS. 2, 3, 4 and 6, is arranged a vertical housing 50, forming the first holding means 50 for holding the axial retention means, which opens into the upper part 48 of the mounting plate 44 and intersects the first bore 46 roughly in line with the base of the head 32 of the rod 12, to accommodate and axially immobilize an elastic clip 38 that forms the elastically deformable means of axial retention. The clip 38 is intended to axially immobilize the head 32 of the rod 12 against the boss 36 and is able to be deformed elastically by the unlocking means 52 to release the head 32.

Also arranged inside the mounting plate 44 is a cavity 53 forming the second holding means 53 holding the unlocking means, which opens into the housing 50 and accommodates the unlocking means 52 intended to elastically deform the clip 38. The cavity 53 opens into a face 74 of the mounting plate 44 facing an opening 76 of the intermediate part 20 of the actuating bar to allow the unlocking means 52 to be manipulated. These unlocking means 52 will be described in greater detail later on in this description.

For example, and without constituting a limitation of the invention, the mounting plate 44 is fixed between the flanges 40 of the intermediate part 20 of the actuating bar via at least two elastic pins 54 passing through drillings 56 in the mounting plate and drillings 58 in the flanges 40 of the intermediate part 20 of the actuating bar.

As an alternative, the mounting plate 44 could have screws passing through it or could be nested in the intermediate part 20 of the actuating bar. It will be noted that, since the mounting plate 44 is not intended to transmit the braking forces exerted on the actuating bar 20 to the control rod 12, its means of attachment to the intermediate part 20 may be specified, in accordance with the relevant legislation, to withstand a high pull out force.

In the preferred embodiment of the invention, the clip 38 consists of a hairpin clip roughly in the shape of an inverted U and intended to straddle the control rod 12 roughly where the rod 12 and the head 32 meet.

The roughly parallel vertical branches 60 of the clip 38 can move between:
- a close-together position, depicted in FIG. 4, in which they are parallel to bear axially against a retention bearing surface 62 of the head 32 of the rod 12 opposite its spherical bearing surface 34 so as to immobilize the head 32 against the boss 36, and
- a parted position, depicted in FIG. 6, in which they can be elastically urged apart by unlocking means 52 in the transverse direction, so as to release the head 32 and allow the rod 12 to be withdrawn from the mounting plate 44.

The hairpin clip 38 also comprises an upper connecting branch 64, transverse overall, connecting the parallel vertical branches 60. The branch 64 is, for example, shaped into the arc of a circle to give the branches 60 some elasticity, but this arrangement does not constitute a limitation on the invention.

The transverse branch 64 rests on a wall 66 of the mounting plate 44 which runs parallel to the axial direction between the axial edges 68 of the housing 50 and transversely between the vertical branches 60 of the clip to determine the vertical position of the clip 38.

Advantageously, the retention bearing surface 62 for retaining the head 32 of the control rod 12 is shaped in the form of a portion of a sphere the rear minimum diameter of which corresponds to the diameter of the control rod and a maximum diameter of which is greater than the separation of the vertical parallel branches 60 of the clip in their close-together position and smaller than the separation of the vertical parallel branches 60 of the clip 38 in their parted position. This configuration guarantees that the head 32 will be held firmly by the clip 38 when its branches 60 are in their close-together position, and also guarantees the possibility of extracting the head 32 from between the branches 60 of the clip 38 when they are in their parted position.

Figure 2:
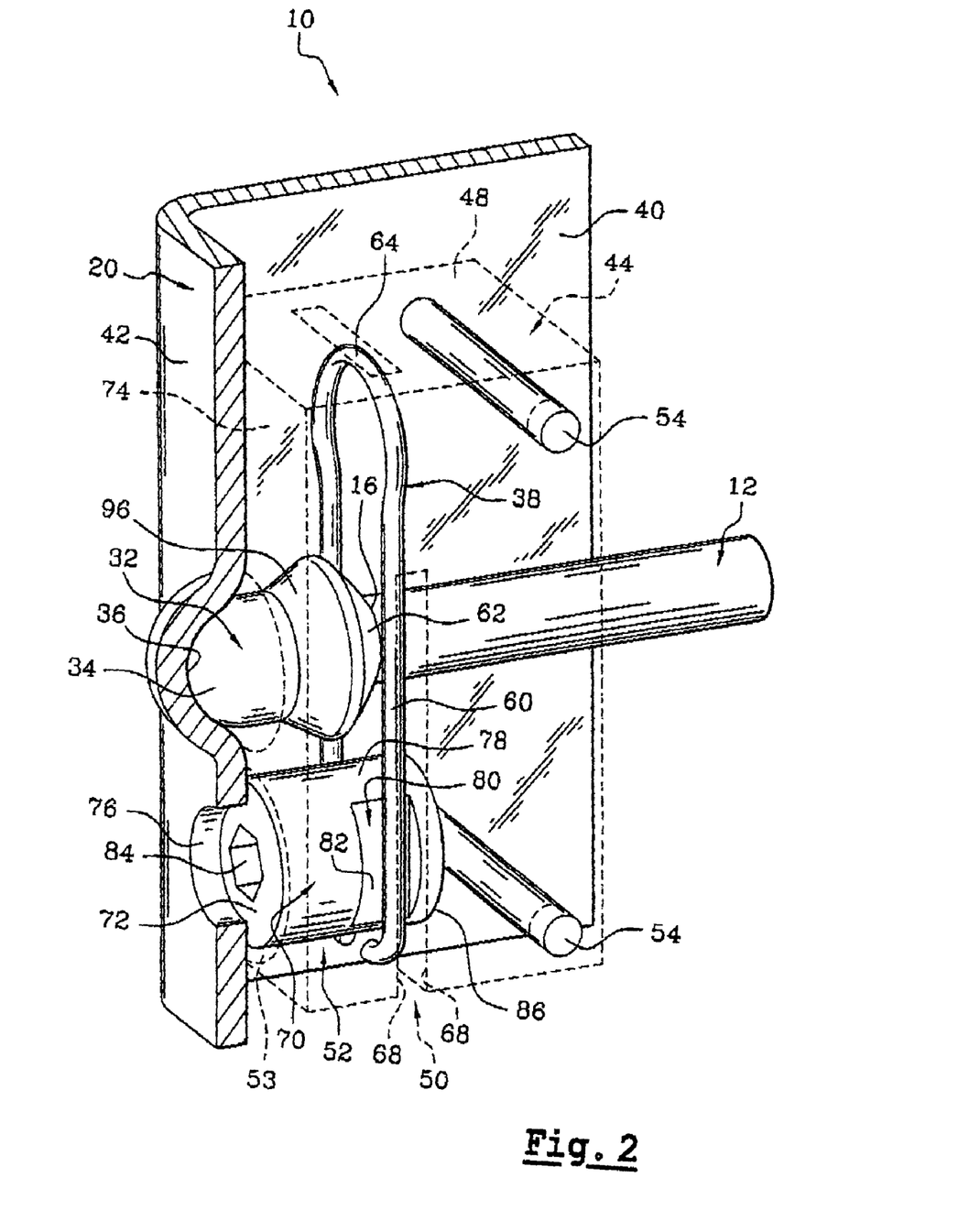
FIG. 2 is an assembled perspective front view of the arrangement according to a first embodiment of the invention.
Figure 3:
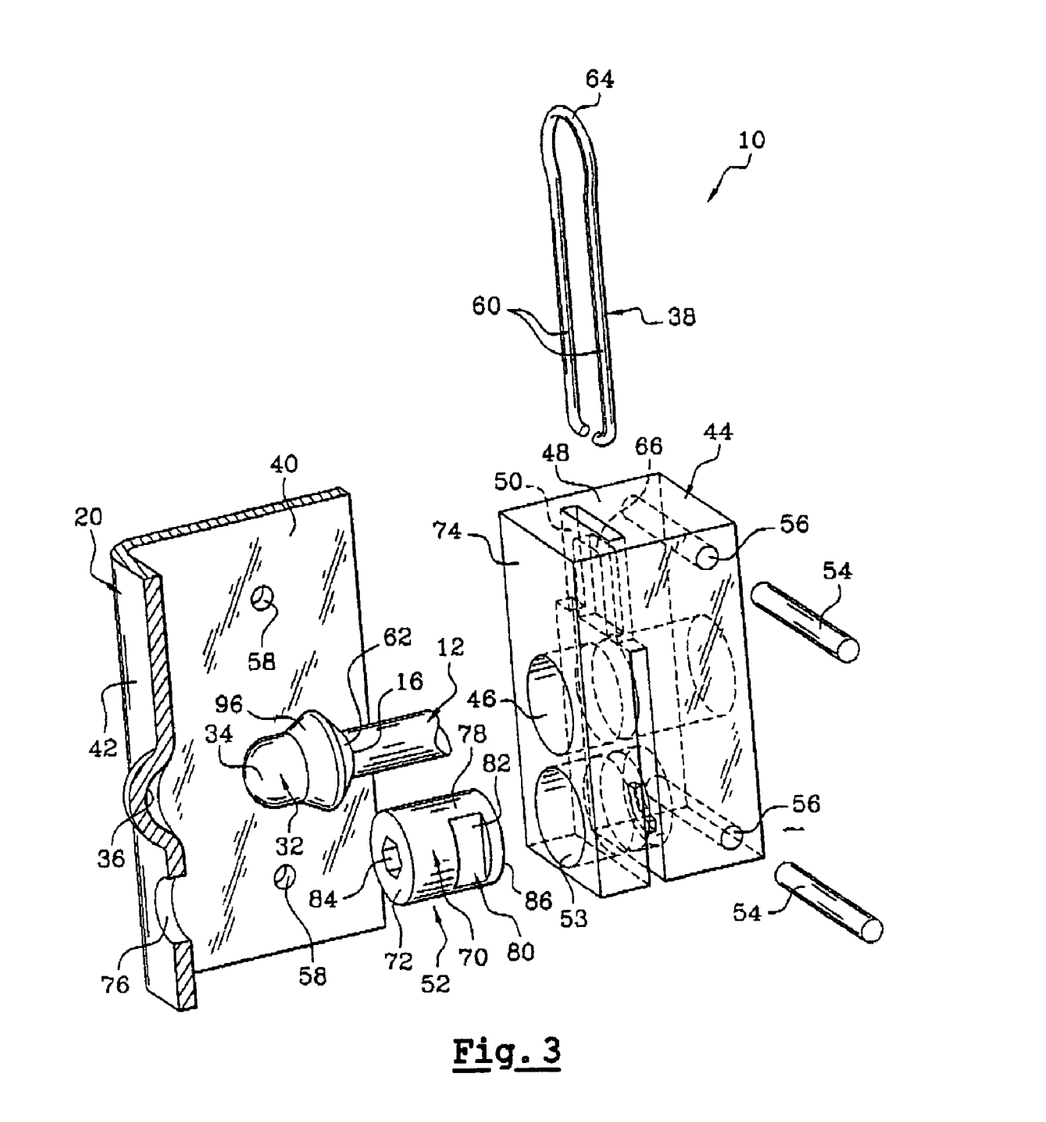
FIG. 3 is an exploded perspective front view with cut away on an axial plane of the arrangement according to the first embodiment of the invention.

In this first embodiment of the invention, as illustrated by FIGS. 2 and 3, the unlocking means 52 comprise a cylindrical barrel 70 mounted to rotate in an axial second bore 53 constituting the cavity which, in this embodiment, forms the second holding means holding the unlocking means. The axial second bore 53 is arranged between the free ends of the vertical branches 60 of the clip 38.

As illustrated by FIGS. 2 and 3, a first end 72 of the barrel 70, comprising driving means, opens into a front face 74 of the mounting plate 44 facing a drilling 76 made in the connecting wall 42 of the intermediate part 20 of the actuating bar, and an intermediate portion 78, depicted in FIG. 6, has two diametrically opposed flats 80 of which the end faces 82, which house the vertical branches 60 of the clip, are distant from one another by a distance "d" corresponding to the separation of the vertical parallel branches 60 of the clip 38 in their close-together position, so that rotation of the barrel 70 determines a parted position of the vertical branches 60 in which they are distant by the diameter "D" of the periphery of the barrel 70.

Of course, the drive means could open into a rear face of the mounting plate 44, without changing the nature of the invention.

As illustrated by FIGS. 2 and 3, in order to turn the barrel 70, the drive means at the first end 72 of the barrel 70 comprise a socket 84. This socket 84 consists, by way of example and without limiting the invention, of a hexagon socket 84.

Advantageously, as illustrated by FIGS. 4 to 7, an opposite second end 86 of the barrel 70 comprises a finger 88 housed in a groove 90 in the shape of an arc of a circle formed in the end of the second bore 53, a first edge 92 of which is intended to form, for the finger 88, a stop that corresponds to the angular position of the barrel 70 associated with the close-together position of the vertical parallel branches 60 of the clip 38, and a second edge 94 of which is intended to form, for the finger, a stop which corresponds to the angular position of the barrel 70 associated with the parted position of the vertical branches 60 of the clip 38.

Turning the barrel 70 between its two angular extreme positions therefore allows the head 32 of the control rod 12 to be locked or unlocked. It will be noted that the barrel 70 is returned to its position of stable equilibrium corresponding to the branches 60 of the clip 38 being housed in the flats 80, by these same branches 60 of the clip 38 which are returned elastically by the connecting branch 64.

However, the head 32 of the control rod 12 may be locked without action on the barrel 70. This is because the head 32 of the rod 12 advantageously has a roughly frustaconical connecting portion 96 inserted axially between its spherical bearing surface 34 and its retention bearing surface 62, to allow the end of the control rod 12 to be introduced through the clip 38 without actuating the barrel 70. It is then the introduction of the head 32 which parts the branches 60 of the clip 38. In this optional configuration, the branches 60 of the clip 38 need to have enough stiffness to allow the head 32 to be introduced under a high force of about 200 N and, in accordance with certain legislation, to prevent said head being pulled out of the clip 38 in the event of a violent impact.

It will finally be noted that the bore 46 in the mounting plate 44, which accommodates the control rod 12, has a diameter corresponding roughly to the maximum diameter of the retention bearing surface 62 of the control rod, this being so as to limit the possibility of foreign bodies entering the housing 50.

According to a second embodiment as an alternative of the invention and which has been depicted in FIGS. 8 to 11, the arrangement 10 comprises a cylindrical peg 50 forming the first holding means for holding the clip, which extends between the flanges 40 from the connecting wall 42 of the intermediate part 20 of the actuating bar 22. The peg 50 is for example fixed by a screw (not depicted) passing through the connecting wall 42 of the intermediate part 20 of the actuating bar 22 and housed in the peg 50.

A rounded elastic upper transverse connecting branch 64 of a hairpin clip 38 is intended to fit into a groove 100 of the cylindrical peg 50 to determine the axial position of said clip 38. The roughly parallel vertical branches 61, 63 of the clip 38 are intended to straddle the rod 12 and immobilize its head 32 axially against a boss 36 similar to one described in the first embodiment.

Advantageously, the rounded elastic upper transverse connecting branch 64 of the clip 38 extends angularly over more than 180 degrees in the groove 100 of the cylindrical peg 50 to determine the vertical position of the clip 38, the curved regions where the branches 61 and 63 meet the branch 64 vertically immobilizing the clip 38.

Figure 9:
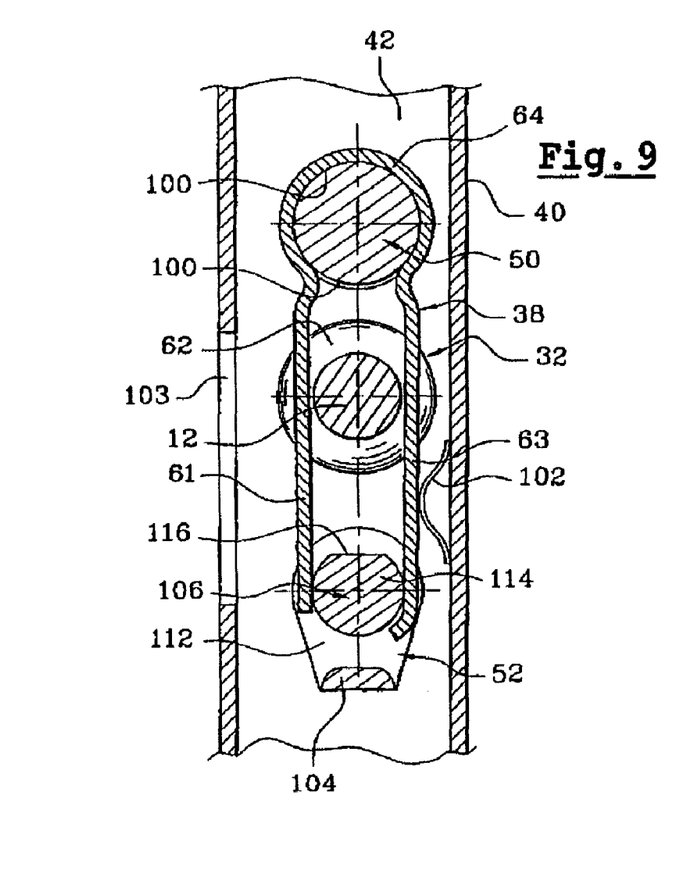
FIG. 9 is a view in cross section on 9-9 of FIG. 11 of the arrangement according to the second embodiment of the invention, depicted with the vertical branches of the clip in an unlocked position, the first branch not being urged by the booster actuating rod.
Figure 10:
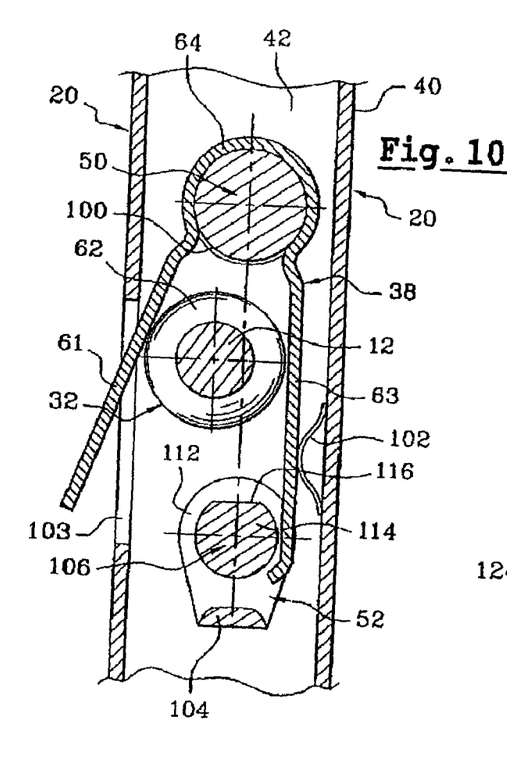
FIG. 10 is a view in cross section on 10-10 of FIG. 11 of the arrangement according to the second embodiment of the invention depicted in a position in which the vertical branches of the clip are unlocked, the first branch being acted upon by the booster actuating rod.

In this configuration, the roughly parallel vertical branches 61, 63 of the clip 38 can be parted in a way roughly similar to the way described with reference to the first embodiment of the invention, except that the branches 61, 63 can move between:
  a locked position, depicted in FIG. 8, in which they are elastically returned toward one another, a first branch 61 being immobilized by the unlocking means 52 and the second branch 63 being immobilized transversely, particularly against a boss 102 of the adjacent flange 40, in which position they are parallel and bear axially against a retention bearing surface 62 of the head 32 of the rod 12 which is at the opposite end to its spherical bearing surface 34, so as to immobilize the head 32 against the boss 36, and
  an unlocked position, depicted in FIG. 9, in which the first vertical branch 61 is unlocked by the unlocking means 52 then can be elastically urged temporarily by the rod 12, after its withdrawal from the boss 36, transversely away from the other branch 63, as depicted in FIG. 10, to release the head 32 and allow the rod 12 to be withdrawn from the intermediate part 20 of the actuating bar 22, the second branch 63 remaining immobilized.

As can be seen, in this second embodiment, the way in which the arrangement 10 works is relatively similar to the one described previously with reference to FIGS. 2 to 7, except that, on the one hand, just one branch 61 is unlocked by the unlocking means 52 and that, on the other hand, the parting of this branch is brought about not by the unlocking means 52 but by a transverse movement of the booster actuating rod 12, occurring after it has been axially withdrawn from the boss 36.

Advantageously, to limit the transverse bulk of the intermediate part 22 of the actuating bar 20 while at the same time allowing sufficient parting of the branch 61 to allow the head 32 of the rod 12 to disengage, the flange 40 of the intermediate part 22 adjacent to the first branch of the clip has a vertical slot 103 intended to allow the first branch to pass out of the intermediate part of the actuating bar when the said first branch is moved away by the rod 12.

In this second embodiment of the invention, the unlocking means 52 comprise a latch bolt 104 mounted to rotate about an axle 106 of which a first end 108 comprising drive means opens into the connecting wall 72 via a drilling 110 forming part of the second holding means 53, as depicted in FIG. 11. This latch bolt 104 can move between a blocking position, depicted in FIG. 8, in which it opposes the transverse parting movement of the first branch 61 of the hairpin clip 38 and a retracted position, depicted in FIGS. 9 and 10, in which it does not oppose the transverse parting movement of the first branch 61 of the clip 38 and in which the first branch 61 of the hairpin clip 38 can be urged away by the rod 12 as depicted more specifically in FIG. 10.

It can be seen that the drive means could obviously be borne by the other end of the axle 106.

Figure 8:
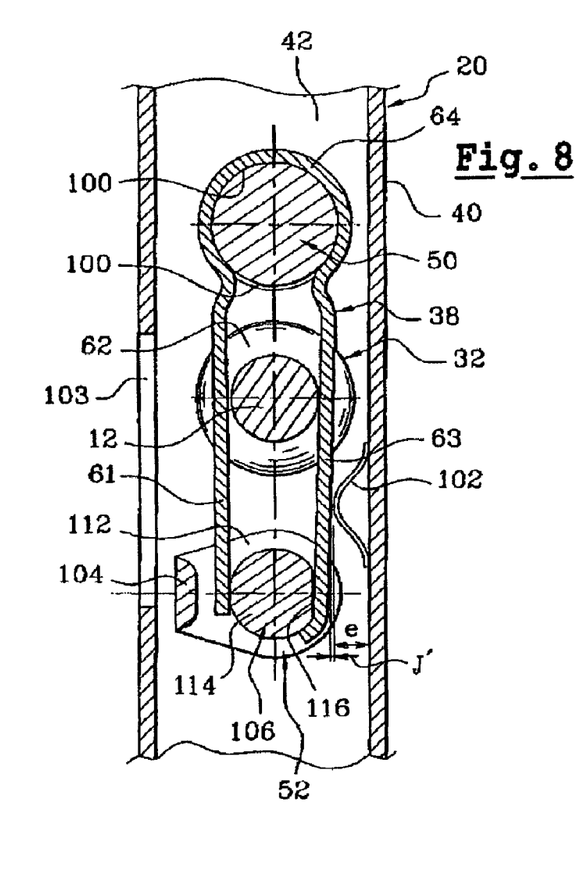
FIG. 8 is a view in cross section on 8-8 of FIG. 11 of the arrangement according to a second embodiment of the invention depicted with the vertical branches of the clip in a locked position.

Thus, starting from the position in FIG. 8 corresponding to the blocked position of the latch bolt 104 and the position in which the branch 61 is locked, the release of the rod 12 is performed in succession by pivoting the latch bolt 104 towards its retracted position of FIG. 9, by pulling on the rod 12 to extract its head 32 from the boss 36, then by moving the branch 61 of the clip away, by urging it transversely using the rod 12.

Advantageously, as illustrated in FIG. 11, the axle 106 about which the latch bolt 104 rotates is arranged between the vertical branches 61, 63 of the clip 38.

Furthermore, the latch bolt 104 runs parallel to the axial direction between two transverse cheeks 112 secured to the axle 106, so that it forms a given clearance with respect to the axle 106. In this way, in the position in which the latch bolt 104 is blocked, the first branch 61 is transversely immobilized between an intermediate portion 114 of the axle 106 arranged between the cheeks 112 and the latch bolt 104 as depicted in FIG. 8, and in its retracted position, the latch bolt 104 is pivoted under the first branch 61 to move it away, as depicted in FIGS. 9 and 10.

As a preference, as illustrated in FIG. 8, in this second embodiment of the invention the boss 102 of the flange 40 adjacent to the second branch 63 of the clip 38 projects into the interior of the intermediate part 20 of the actuating bar 22 by a transverse distance "e" intended to allow the transverse immobilization with clearance "J'" of said second branch 63 in the blocked position of the latch bolt 104 which position is associated with the locked position of the clip 38. It will be possible to envisage immobilizing the branch 63 with a clearance "J'" that varies according to the internal clearances of the arrangement 10 and according to the elasticity of the branch 63 of the clip 38.

Furthermore, as illustrated by FIGS. 8 to 10, the axle 106 of rotation of the latch bolt 104 comprises, on its intermediate portion 114 of a determined diameter, a flat 116 which is arranged opposite the latch bolt 104 to immobilize the second branch 63 without clearance against the boss 102 when the latch bolt 104 occupies its retracted position of FIGS. 9 and 10 and thus make it easier to move the first branch 61 of the clip 38 away as depicted in FIG. 10.

As a preference, to ensure better [lacuna] of the latch bolt 104, a second end 118 of the axle 106 of the latch bolt 104 is mounted to rotate in a spacer 120 forming the other part of the second holding means 53, as depicted in FIG. 11. The end 118 is, for example, housed in a drilling 122 of the spacer 120. The spacer 120 has been depicted in dotted line in FIG. 11.

The spacer 120 is for example fixed between the flanges 40 of the intermediate part 20 of the actuating bar 22 by at least two elastic pins 124 which pass through drillings 128 in the spacer and drillings 130 in the flanges 40 of the intermediate part 20 of the actuating bar 22.

In a way similar to the first embodiment of the invention, the drive means at the first end 108 of the axle 106 of the latch bolt 104 comprise a socket (not depicted), particularly a hexagon socket.

It will also be understood that, in a similar way to in the first embodiment of the invention, the retention bearing surface 62 for retaining the head 32 of the control rod 12 is shaped in the form of a portion of a sphere a rear minimum diameter of which corresponds to the diameter of the control rod 12 and a maximum diameter of which is greater than the separation of the parallel vertical branches 61, 63 of the clip 38 in their locked position of FIG. 8 and less than the separation of the vertical parallel branches 61, 63 of the clip 38 in their unlocked position and when the first branch 61 is transversely moved away by the booster actuating rod 12 as depicted in FIG. 10. The invention therefore makes it possible to couple a booster control rod 12 to a vehicle brake pedal actuating bar 22 and disconnect it therefrom, at will.

What is claimed is:

1. An arrangement (10) for disconnectably coupling an axially orientated motor vehicle brake booster control rod (12) to a brake pedal (14) of the vehicle in which a first end (16) of said axial control rod (12) is coupled at least in terms of rotation about a transverse axis to an intermediate part (20) of a roughly vertical actuating bar (22), said control rod (12) having a first end (24) that is articulated about a roughly horizontal axis with respect to a vehicle body structural element (28) and a second end (30) that receives an input from said brake pedal (14), said first end (16) of said control rod (12) comprises a head (32) having at least one spherical bearing surface (34) that is housed in a complementary boss (36) formed in a wall of said intermediate part (20) of said actuating bar (22), characterized in that said head (32) is kept in contact with said boss (36) via elastically deformable axial retention means (38) interposed between said intermediate part (20) of said actuating bar (22) and said control rod (12), and in that said deformation is controlled by unlocking means (52) accessible from outside said intermediate part (20) of the actuating bar (22) to form a ball joint connection that may be disconnected at will, said intermediate part (20) of the actuating bar (22) having a U-shaped section orientated roughly vertically with first and second flanges (40,40') that elastically deform to receive said control rod (12), said elastically deformable axial retention means (38) and said unlocking means (52) located there between, and a connecting wall (42) arranged transversely between said first and second flanges (40,40'), said boss (36) for said spherical bearing surface (34) of said head (32) of said control rod (12) being formed in said connecting wall (42);

characterized in that said intermediate part (20) of said actuating bar (22) houses a first holding means (50) to immobilize, in line with the base of said head (32) of said control rod (12), an elastic clip that forms said elastically deformable axial retention means (38) that axially immobilizes said head (32) of said control rod (12) against said boss (36) and that is deformed elastically by said unlocking means (52) to release said head (32), and a second holding means (53) for holding said unlocking means (52);

and a mounting plate (44) including said first and second holding means, said plate (44) being housed between said first and second flanges (40,40') of said intermediate part (20) of said actuating bar (22) and having a first bore (46) that receives said control rod (12) with a clearance (J) to allow said control rod (12) to articulate, and a vertical housing opening (50) in an upper part (48) of said mounting plate (44) that Intersects said first bore (46) roughly in line with a base of said head (32) of said control rod (12) and said vertical housing opening (50) forming said first holding means for holding the clip of said elastically deformable axial retention means (38) and a cavity (53) opening into said vertical housing (50) facing said clip of said elastically deformable axial retention means (38) and into a face (74) of said mounting plate (44) that faces an opening (76) of said intermediate part (20) of said actuating bar (22) which forms said second holding means (53) for holding said unlocking means (52).

2. The arrangement (10) according to claim 1, characterized in that said mounting plate (44) is fixed between said first and second flanges (40,40') of said intermediate part (20) of the actuating bar (22) by at least two elastic pins (54) that pass through drillings (56) in said mounting plate (44) and drillings (58) in said first and second flanges (40,40') of the intermediate part (20) of the actuating bar (22).

3. The arrangement according to claim 2, characterized in that said clip of said elastically deformable axial retention means (38) is a hairpin clip that straddles said control rod (12) and has roughly parallel vertical branches (60,60') that move between a close-together position, towards which they are elastically returned, in which they are parallel and bear axially against a retention beating surface (62) of said head (32) of said control rod (12) which is opposite the spherical bearing surface (34) to immobilize said head (32) against said boss (36), and a parted position in which they can be temporarily elastically urged apart by said unlocking means (52) in the transverse direction, to release said head (32) and allow said control rod (12) to be withdrawn from said mounting plate (44).

4. The arrangement (10) according to claim 3, characterized in that said bore (46) in said mounting plate (44) which accommodates the control rod (12) has a diameter that roughly corresponding to a maximum diameter of said retention bearing surface (62) of said control rod (12).

5. The arrangement (10) according to claim 4, characterized in that said hairpin clip of said elastically deformable axial retention means (38) comprises an elastic upper transverse connecting branch (64) connecting the parallel vertical branches (60,60') and that rest on a wall (66) of said mounting plate (44), that runs parallel to the axial direction between said axial edges (68) of said housing that forms said first holding means (50) and which runs transversely between said vertical branches (60.60') to determine the vertical position of said clip of said elastically deformable axial retention means (38).

6. The arrangement (10) according to claim 5, characterized in that said unlocking means (52) comprise a cylindrical barrel (70) mounted to rotate in an axial second bore constituting the cavity in said mounting plate (44) that forms said second holding means (53) and is arranged between the free ends of said vertical branches (60,60') of said clip of said elastically deformable axial retention means (38), said cylindrical barrel (70) having a first end (72) comprising drive means that opens into a front face (74) of said mounting plate (44) opposite a drilling (76) made in said connecting wall (42) of said intermediate part (20) of said actuating bar (22), said cylindrical barrel (70) having an intermediate portion (78) that has first and second diametrically opposed flats (80,80') with corresponding end faces (82,82') that accommodate said vertical branches (60,60') of said clip of said elastically deformable axial retention means (38) and are separated from one another by a distance (d) corresponding to a separation in said vertical parallel branches (60,60') of said clip of said elastically deformable axial retention means (38) in their close-together position and with rotation of said barrel (70) creates a parted position of said vertical branches (60,60') in which said branches (60,60') are separated a distance equal to a diameter (D) of the periphery of said barrel (70).

7. The arrangement (10) according to claim 6, characterized in that said barrel (70) has an opposite second end (86) comprises a finger (88) that is housed in a groove (90) in the shape of an arc of a circle formed in the end of said second bore (53), a first edge (92) that forms a first stop for said finger (88) that corresponds to the angular position of said barrel (70) associated with the close-together position of said vertical parallel branches (60,60') of said clip (38), and a second edge (94) that forms a second stop for said that corresponds to the angular position of said barrel (70) associated with the parted position of said vertical branches (60,60') of said clip of said elastically deformable axial retention means (38)

8. The arrangement (10) according to claim 7, characterized in that a drive means at an first end (72) of said barrel (70) comprise a socket (84), particularly a hexagon socket.

9. The arrangement (10) according to claim 8, characterized in that a retention bearing surface (62) for retaining said head (32) of said control rod (12) is shaped in the form of a portion of a sphere that has a rear minimum diameter which corresponds to the diameter of said control rod (12) and a maximum diameter which is greater than the separation of said vertical parallel branches (60,60') of said clip of said elastically deformable axial retention means (38) in a close-together position and smaller than a separation of said vertical parallel branches (60,60') of said clip of said elastically deformable axial retention means (38) in a parted position.

10. The arrangement (10) according to claim 9, characterized in that said head (32) of said control rod (12) has a roughly frustaconical connecting portion (96) inserted axially between said spherical bearing surface (34) and said retention bearing surface (62) to allow the end of said control rod (12) to be introduced through said clip of said elastically deformable axial retention means (38) without actuating said barrel (70).

11. The arrangement (10) according to claim 1 characterized in that said intermediate part (20) further comprises a cylindrical peg (50) that forms said first holding means for holding said clip of said elastically deformable axial retention means (38) and extends between said flanges (40) from said connecting wall (42) of said actuating bar (22) and into a groove (100) that receives a rounded elastic upper transverse connecting branch (64) of a hairpin clip of said elastically deformable axial retention means (38), said hairpin clip of said elastically deformable axial retention means (38) having roughly parallel vertical branches (61, 63) that straddle said control rod (12) and axially immobilize said head (32) against said boss (36).

12. The arrangement (10) according to claim 11, characterized in that said hairpin clip of said elastically deformable axial retention means (38) wherein said rounded elastic upper transverse connecting branch (64) extends over more than 180 degrees in said groove (100) of said cylindrical peg (50) to determine the vertical position of said hairpin clip of said elastically deformable axial retention means (38).

13. The arrangement (10) according to claim 12, characterized in that said roughly parallel vertical branches (61, 63) of said hairpin clip of said elastically deformable axial retention means (38) move between a locked position in which they are elastically returned toward one another with said first branch (61) being immobilized by said unlocking means (52) and said second branch (63) being immobilized transversely, particularly against a boss (102) of an adjacent flange (40), in which position they are parallel and bear axially against a retention axial bearing surface (62) for retaining said head (32) of said control rod (12) which is at the opposite end to its spherical bearing surface (34), so as to immobilize said head (32) against said boss (36), and an unlocked position in which said first vertical branch (61) is unlocked by said unlocking means (52) and is elastically urged temporarily by said control rod (12) transversely away from said second branch (63) to release said head (32) and allow said control rod (12) to be withdrawn from said intermediate part (20) of said actuating bar (22) while said second branch (63) remains immobilized.

14. The arrangement (10) according to claim 13, characterized in that said intermediate part (20) of said actuating bar (22) wherein said flange (40) located adjacent to said first branch (61) of said haipin clip of said elastically deformable axial retention means (38) with a vertical slot (103) that allows said first branch (61) to pass out of said intermediate part (20) of said actuating bar (22) when said first branch (61) is moved away by said control rod (12).

15. The arrangement (10) according to claim 14, characterized in that said unlocking means (52) comprise a latch bolt (104) That rotates about an axle (106) of which a first end (108) comprising drive means opens into said connecting wall (42) via a drilling (110) that forms part of said second holding means (53), and which moves between a blocking position to oppose a transverse parting movement of said first branch (61) of said hairpin clip of said elastically deformable axial retention means (38) and a retracted position in which it does not oppose said transverse parting movement of said first branch (61) of said hairpin clip of said elastically deformable axial retention means (38) and in which said first branch (61) of said hairpin clip of said elastically deformable axial retention means (38) is urged away by said control rod (12).

16. The arrangement (10) according to claim 15, characterized in that said axle (106) about which said latch bolt (104) rotates is arranged between said vertical branches (61, 63) of said hairpin clip of said elastically deformable axial retention means (38) and In that said latch bolt (104) runs parallel to the axial direction between two transverse cheeks (112) secured to said axle (106) so that in a blocking position said first branch (61) is transversely immobilized between an intermediate portion (114) of said axle (106) arranged between said cheeks (112) and said latch bolt (104), and so that in a retracted position said latch bolt (104) is pivoted under said first branch (61) to give it a parting movement.

17. The arrangement (10) according to claim 16, characterized in that a boss (102) on said flange (40) is adjacent to said second branch (63) of said hairpin clip of said elastically deformable axial retention means (38) and projects into the interior of said intermediate part (20) of said actuating bar (22) by a transverse distance (e) to allow a transverse immobilization with clearance (J') of said second branch (63) when said hairpin clip of said elastically deformable axial retention means (38) is in a locked position associated with said blocked position of said latch bolt (104).

18. The arrangement (10) according to claim 17, characterized in that said axle (106) about which said latch bolt (104) rotates has an intermediate portion (114) with a flat portion (116) arranged opposite said latch bolt (104) to immobilize, without clearance, said second branch (63) against said boss (102) when said latch bolt (104) occupies a retracted position and thus make it easier to part said first branch (61) of said hairpin clip of said elastically deformable axial retention means (38).

19. The arrangement (10) according to claim 18, characterized in that said axle (106) of a second end (118) of said latch bolt (104) is mounted to rotate in a spacer (120) that forms part of said second holding means (53) and is fixed between said flanges (40,40') of said intermediate part (20) of said actuating bar (22) via at least two elastic pins (124) passing through drillings (128) in said spacer (120) and drillings (130) in said flanges (40,40') of said intermediate part (20) of said actuating bar (22).

20. The arrangement (10) according to claim 19, characterized in that a drive means at said first end (108) of said axle (106) of said latch bolt (104) comprises a socket, particularly a hexagonal socket.

21. The arrangement (10) according to claim 20, characterized in that said retention bearing surface (62) for retaining said head (32) of said control rod (12) has the shape of a portion of a sphere having a rear minimum diameter that corresponds to a diameter of said control rod (12) and a maximum diameter that is greater than the separation of said vertical parallel branches (61, 63) of said hairpin clip of said elastically deformable axial retention means (38) in their locked position and less than the separation of said vertical parallel branches (61, 63) of said hairpin clip of said elastically deformable axial retention means (38) when they occupy an unlocked position and said first branch (61) is transversely moved away by said control rod (12).

* * * * *